United States Patent [19]

Findlan et al.

[11] Patent Number: 5,236,517

[45] Date of Patent: Aug. 17, 1993

[54] FLUX FORMULATION FOR UNDERWATER WET FLUX-CORED ARC WELDING OF NICKEL-BASED AND AUSTENITIC STAINLESS STEELS

[75] Inventors: Shane J. Findlan; Gregory J. Frederick, both of Harrisburg, N.C.

[73] Assignee: Electric Power Research Institute, Palo Alto, Calif.

[21] Appl. No.: 937,960

[22] Filed: Aug. 28, 1992

[51] Int. Cl.$^5$ .............................................. B23K 35/34
[52] U.S. Cl. .................................................... 148/23
[58] Field of Search ........................................ 148/26

[56] References Cited

U.S. PATENT DOCUMENTS

| | | | |
|---|---|---|---|
| 3,691,340 | 9/1972 | Landis et al. | 219/146 |
| 3,742,185 | 6/1973 | Parks | 219/146 |
| 4,214,141 | 7/1980 | Okuda | 148/26 |
| 4,361,449 | 11/1982 | More | 148/26 |
| 4,367,394 | 1/1983 | Sakai | 148/26 |
| 4,510,374 | 4/1985 | Kobayashi et al. | 219/146.1 |
| 4,571,480 | 2/1986 | Sakai et al. | 219/146.3 |
| 4,683,011 | 7/1987 | Weaver | 148/26 |
| 4,723,061 | 2/1988 | Munz et al. | 219/146.24 |
| 4,843,212 | 6/1989 | Shneerov et al. | 219/146.23 |
| 4,848,647 | 7/1989 | Gentry et al. | 228/263 |
| 4,861,392 | 8/1989 | Grabe | 148/23 |
| 4,994,640 | 2/1991 | Kiser | 219/145.22 |
| 4,999,478 | 3/1991 | Bushey et al. | 219/137 WM |
| 5,003,155 | 3/1991 | Chai et al. | 219/145.22 |
| 5,009,105 | 4/1991 | Richardson et al. | 73/621 |
| 5,055,655 | 10/1991 | Chai et al. | 219/145.22 |
| 5,059,384 | 10/1991 | Dixon et al. | 376/260 |

*Primary Examiner*—Peter D. Rosenberg
*Attorney, Agent, or Firm*—Heller, Ehrman, White & McAuliffe

[57] ABSTRACT

A flux formulation particularly suited for underwater wet flux-cored arc welding of nickel-based and austenitic stainless steels, such as internals of reactor pressure vessels, is free of halogen-containing components and has the following composition:

40-80%: Rutile, Titania ($TiO_2$),
0-30%: Zirconium oxide ($ZrO_2$),
0-10%: Silicon oxide ($SiO_2$),
0-5%: Potassium titanate ($K_2O/TiO_3$ at ratio of 3:1).
0-30%: Lithium silicate ($Li_2SiO_3$),
0-15%: Lithium carbonate ($Li_2CP_3$), provided that the sum of the contents of lithium silicate ($Li_2SiO_3$) and lithium carbonate ($Li_2CO_3$) be no less than 10%.

9 Claims, No Drawings

FLUX FORMULATION FOR UNDERWATER WET FLUX-CORED ARC WELDING OF NICKEL-BASED AND AUSTENITIC STAINLESS STEELS

BACKGROUND OF THE INVENTION

This invention relates to underwater flux-cored arc welding and, more particularly, to flux formulations for such welding for performing repairs to nickel-based and austenitic stainless steel materials.

Most internal components of a reactor pressure vessel are made of nickel-based and austenitic stainless steel materials. Because of the high radiation field and inaccessibility of components in the lower section of such a vessel, automated underwater wet welding is considered the most practical method of performing repairs to materials for such internals. The mechanical methods presently being used for this type of repair application produce crevices, and this promotes concerns about so-called intergranular stress corrosion cracking (IGSCC), crevice corrosion and pitting. A welded repair would offer a permanent fix without creating additional crevice locations. So-called underwater wet-shielded metal arc welding (SMAW) has been successfully used to repair components in radiation areas in upper sections of reactor pressure vessels, although this is a manually operated process not feasible for remote applications.

The flux-cored arc welding process (FCAW) has been developed because of its ease of automation, out-of-position welding proficiency and self-shielding capabilities. The flux-cored arc welding process is characterized by the use of a continuously fed consumable welding wire comprised of a metal sheath filled with flux and alloying elements. A flux formulation for a self-shielding flux-cored wire is used to form a slag and to produce a shielding gas to protect the molten transfer and weld puddle, similar to the SMAW process. Conventional filler materials, however, include harmful halogen-containing components, such as calcium fluoride ($CaF_2$) and cryolite ($Na_3AlF_6$) A typical prior art self-shielded flux chemistry contains:

- 50–70%: Rutile, Titania ($TiO_2$),
- 5–20%: Zirconium oxide ($ZrO_2$),
- 2–7%: Silicon oxide ($SiO_2$),
- 1–3%: Cryolite ($Na_3AlF_6$),
- 10–30%: Potassium titanate ($K_2O/TiO_3$ at ratio of 3:1).

The halogens that dissociate in the welding arc form free halogen ions, and the halogen ions introduced into water attack passive corrosion-resistant layers typical of austenitic stainless steel and nickel-based alloys, promoting corrosion cracking.

It is therefore an object of the present invention to provide a self-shielded flux formulation to accommodate underwater wet flux-cored arc welding process for repairing components of a reactor pressure vessel.

It is another object of the invention to establish a flux formulation with high underwater weldability without including halogen-containing elements.

SUMMARY OF THE INVENTION

Formulations according to the present invention, with which the above and other objects can be accomplished, may be characterized as containing an experimentally determined minimum amount of lithium silicate and/or lithium carbonate in place of the cryolite and calcium fluoride components of the prior art flux described above.

DETAILED DESCRIPTION OF THE INVENTION

Flux formulations for underwater wet flux-cored arc welding of nickel-based and austenitic stainless steels according to the present invention are characterized as not including any halogen-containing component and being of composition given as follows:

- 40–80%: Rutile, Titania ($TiO_2$),
- 0–30%: Zirconium oxide ($ZrO_2$),
- 0–10%: Silicon oxide ($SiO_2$),
- 0–5%: Potassium titanate ($K_2O/TiO_3$ at ratio of 3:1).
- 0–30%: Lithium silicate ($Li_2SiO_3$),
- 0–15%: Lithium carbonate ($Li_2CO_3$), provided that the sum of the contents of lithium silicate ($Li_2SiO_3$) and lithium carbonate ($Li_2CO_3$) be no less than 10%.

The above compositions are based on the use of commercial grade minerals and ores which contain traces of other minerals generally not affecting weldability. Of the flux formulations satisfying the conditions given above, those with approximate compositions given below are considered the optimum for underwater wet flux-cored arc welding of nickel-based and austenitic stainless steel materials:

- 60%: Rutile, Titania ($TiO_2$),
- 10%: Zirconium oxide ($ZrO_2$),
- 5%: Silicon oxide ($SiO_2$),
- 1%: Potassium titanate ($K_2O/TiO_3$ at ratio of 3:1).
- 19%: Lithium silicate ($Li_2SiO_3$), and
- 5%: Lithium carbonate ($Li_2CO_3$).

The principal application of the flux formulations according to the invention is to the underwater repair of internals of reactor pressure vessels. Secondary applications include improvement of existing underwater wet FCAW capabilities of stainless steel and nickel-based materials and expansion of the welding parameter envelope of underwater wet FCAW of austenitic stainless steel and nickel-based alloys. A range of flux formulations utilizing lithium silicate and lithium carbonate as substitutes for calcium fluoride and cryolite have been tested in Inconel 625 and stainless steel 308L flux-cored wires. A test matrix of a welding parameters was conducted at a depth of 3 and 20 feet, utilizing automated FCAW process. It has been found that calcium carbonate ($CaCO_3$) may be used as a substitute for lithium carbonate, although lithium carbonate provides superior arc stability.

In summary, the flux chemistry according to the present invention is designed specifically for the wet underwater FCAW process, for the welding of austenitic stainless steels and nickel-based alloys such as Inconel. The flux chemistry of the invention is designed to address wet welding application of nuclear components such as internals of reactor pressure vessels and other stainless steel or nickel-based alloys where a halogen-free water chemistry must be maintained. The flux chemistry according to the present invention has been found to provide readily detachable slag, typically removed by a light brushing or vacuuming.

What is claimed is:

1. A flux formulation for underwater wet flux-cored arc welding, said flux formulation being free of halogen-containing components and having the following composition:

40–80%: Rutile, Titania ($TiO_2$),

0–30%: Zirconium oxide ($ZrO_2$),
0–10%: Silicon oxide ($SiO_2$),
0–5%: Potassium titanate ($K_2O/TiO_3$ at ratio of 3:1).
0–30%: Lithium silicate ($Li_2SiO_3$),
0–15%: Lithium carbonate ($Li_2CO_3$), provided that the sum of the contents of lithium silicate ($Li_2SiO_3$) and lithium carbonate ($Li_2CO_3$) be no less than 10%.

2. The flux formulation of claim 1 having approximately the following composition:
60%: Rutile, Titania ($TiO_2$),
10%: Zirconium oxide ($ZrO_2$),
5%: Silicon oxide ($SiO_2$),
1%: Potassium titanate ($K_2O/TiO_3$ at ratio of 3:1).
19%: Lithium silicate ($Li_2SiO_3$), and
5%: Lithium carbonate ($Li_2CO_3$).

3. A flux formulation for underwater wet flux-cored arc welding, said flux formulation being free of halogen-containing components and having the following composition:
40–80%: Rutile, Titania ($TiO_2$),
0–30%: Zirconium oxide ($ZrO_2$),
0–10%: Silicon oxide ($SiO_2$),
0–5%: Potassium titanate ($K_2O/TiO_3$ at ratio of 3:1).
0–30%: Lithium silicate ($Li_2SiO_3$),
0–15%: Calcium carbonate ($Ca_2CO_3$), provided that the sum of the contents of lithium silicate ($Li_2SiO_3$) and Calcium carbonate ($Ca_2CO_3$) be no less than 10%.

4. A welding wire for underwater wet flux-cored arc welding, said welding wire comprising a flux formulation and a metal sheath filled with said flux formulation, said flux formulation being free of halogen-containing components and having the following composition:
40–80%: Rutile, Titania ($TiO_2$)
0–30%: Zirconium oxide ($ZrO_2$),
0–10%: Silicon oxide ($SiO_2$),
0–5%: Potassium titanate ($K_2O/TiO_3$ at ratio of 3:1).
0–30%: Lithium silicate ($Li_2SiO_3$),
0–15%: Lithium carbonate ($Li_2CO_3$) or calcium carbonate ($Ca_2CO_3$), provided that the sum of the contents of lithium silicate ($Li_2SiO_3$) and lithium carbonate ($Li_2CO_3$) or lithium silicate ($Li_2SiO_3$) and calcium carbonate ($Ca_2CO_3$) be no less than 10%.

5. A welding wire of claim 4 wherein said flux formulation has approximately the following composition:
60%: Rutile, Titania ($TiO_2$),
10%: Zirconium oxide ($ZrO_2$),
5%: Silicon oxide ($SiO_2$),
1%: Potassium titanate ($K_2O/TiO_3$ at ratio of 3:1).
19%: Lithium silicate ($Li_2SiO_3$), and
5% Lithium carbonate ($Li_2CO_3$).

6. The welding wire of claim 4 wherein said flux formulation has approximately the following composition:
60%: Rutile, Titania ($TiO_2$),
10%: Zirconium oxide ($ZrO_2$),
5%: Silicon oxide ($SiO_2$),
1%: Potassium titanate ($K_2O/TiO_3$ at ratio of 3:1).
19%: Lithium silicate ($Li_2SiO_3$), and
5%: Calcium carbonate ($Ca_2CO_3$).

7. The flux formulation of claim 1 which is contained inside a metal sheath to serve as a filler.

8. The flux formulation of claim 2 which is contained inside a metal sheath to serve as a filler.

9. The flux formulation of claim 3 which is contained inside a metal sheath of serve as a filler.

* * * * *